US010796457B2

(12) United States Patent
Beek

(10) Patent No.: US 10,796,457 B2
(45) Date of Patent: Oct. 6, 2020

(54) IMAGE-BASED COMPRESSION OF LIDAR SENSOR DATA WITH POINT RE-ORDERING

(71) Applicant: Intel Corporation, Santa Clara, CA (US)

(72) Inventor: Petrus van Beek, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 16/018,687

(22) Filed: Jun. 26, 2018

(65) Prior Publication Data

US 2019/0051017 A1 Feb. 14, 2019

(51) Int. Cl.
*G06T 9/00* (2006.01)
*G06T 7/521* (2017.01)
*G06T 7/55* (2017.01)

(52) U.S. Cl.
CPC .............. *G06T 9/00* (2013.01); *G06T 7/521* (2017.01); *G06T 7/55* (2017.01); *G06T 9/001* (2013.01); *G06T 2207/10028* (2013.01); *G06T 2207/30252* (2013.01)

(58) Field of Classification Search
CPC ................................ G06T 9/00; G06T 7/521
See application file for complete search history.

(56) References Cited

U.S. PATENT DOCUMENTS

| 7,969,558 B2 | 6/2011 | Hall |
| 2010/0271614 A1 | 10/2010 | Albuquerque et al. |
| 2016/0127746 A1* | 5/2016 | Maurer ............. H04N 19/65 |
| | | 382/232 |
| 2018/0268570 A1* | 9/2018 | Budagavi ............. G06T 9/001 |
| 2019/0164018 A1* | 5/2019 | Zhu ..................... G06T 7/11 |

FOREIGN PATENT DOCUMENTS

DE 10 2018 129 975 A1 6/2019

OTHER PUBLICATIONS

Notice of Publication Received for Chinese Patent Application No. 201811426281.1, dated Jul. 11, 2019, 4 pages.
Chen, et al., "Point Cloud Encoding for 3D Building Model Retrieval," journal, Feb. 2014, vol. 16, No. 2, IEEE Transactions on Multimedia.
Samuel Gibbs, "Hackers can Trick Self-Driving Cars into Taking Evasive Action," newspaper, Sep. 7, 2015, 3 pages, The Guardian, London, England.

(Continued)

*Primary Examiner* — Tuan H Nguyen
(74) *Attorney, Agent, or Firm* — Spectrum IP Law Group LLC

(57) ABSTRACT

Methods and apparatus relating to image-based compression of Light Detection And Ranging (LIDAR) sensor data with point re-ordering are described. In an embodiment, logic receives distance sensor data and converts the received distance sensor data to point cloud data. The point cloud data corresponds to a set of points in a three dimensional (3D) space. The logic circuitry packs/organizes the converted point cloud data into one or more two dimensional (2D) arrays. Data stored in the one or more 2D arrays are compressed to generate a compressed version of the point cloud data. Other embodiments are also disclosed and claimed.

24 Claims, 10 Drawing Sheets

(56) References Cited

OTHER PUBLICATIONS

Olsen, et al., "Guidelines for the Use of Mobile LIDAR in Transportation Application," report, 2013, 208 pages, report 748, National Cooperative Highway Research Program, Washington DC.
Kim, et al., "LIDAR Pulse Coding for High Resolution Range Imaging at Improved Refresh Rate," Research Article, Oct. 17, 2016, 19 pages, vol. 24, No. 21, Optics Express.

* cited by examiner

| geometry packing | encoding file type | file size (bytes) | byte/point | Mbit/s |
|---|---|---|---|---|
| point cloud | PCD ASCII | 3045411.7 | 51.6 | 243.6 |
| | PCD binary | 711881.0 | 12.1 | 57.0 |
| | PCD binary compressed | 636188.6 | 10.8 | 50.9 |
| | LAS | 1179868.6 | 20.0 | 94.4 |
| | LAZ (LASzip) | 264164.7 | 4.5 | 21.1 |
| x,y,z as three 1-channel images | PGM (raw) | 353943.5 | 6.0 | 28.3 |
| | PGM.GZ (gzipped) | 165216.7 | 2.8 | 13.2 |
| | PNG | 109239.1 | 1.9 | 8.7 |
| | JPEG-LS | 122033.6 | 2.1 | 9.8 |
| | ZFP | 217791.7 | 3.7 | 17.4 |
| range as single 1-channel image | PGM (raw) | 117981.2 | 2.0 | 9.4 |
| | PGM.GZ (gzipped) | 59114.0 | 1.0 | 4.7 |
| | PNG | 45006.7 | 0.8 | 3.6 |
| | JPEG-LS | 49631.0 | 0.8 | 4.0 |
| | ZFP | 84522.7 | 1.4 | 6.8 |

FIG. 4

| geometry packing | encoding file type | file size (bytes) | byte/point | Mbit/s |
|---|---|---|---|---|
| x,y,z as three 1-channel images without deinterleaving | PGM (raw) | 350856.1 | 6.1 | 28.1 |
| | PGM.GZ (gzipped) | 146110.0 | 2.5 | 11.7 |
| | PNG | 90906.6 | 1.6 | 7.3 |
| | JPEG-LS | 144210.1 | 2.5 | 11.5 |
| | ZFP | 188589.4 | 3.3 | 15.1 |
| x,y,z as three 1-channel images with deinterleaving | PGM (raw) | 350856.1 | 6.1 | 28.1 |
| | PGM.GZ (gzipped) | 140470.0 | 2.4 | 11.2 |
| | PNG | 90096.8 | 1.6 | 7.2 |
| | JPEG-LS | 98897.7 | 1.7 | 7.9 |
| | ZFP | 188589.4 | 3.3 | 15.1 |

FIG. 6

| Laser ID # (elevation) | Rotational angle # (azimuth) | | | | | | | | |
|---|---|---|---|---|---|---|---|---|---|
| | 1 | 2 | 3 | 4 | 5 | 6 | 7 | 8 | etc |
| 1 | | | | | | | | | |
| 17 | | | | | | | | | |
| 2 | | | | | | | | | |
| 18 | | | | | | | | | |
| 3 | | | | | | | | | |
| 19 | | | | | | | | | |
| 4 | | | | | | | | | |
| 20 | | | | | | | | | |
| etc. | | | | | | | | | |

FIG. 5A

| Laser ID # (elevation) | Rotational angle # (azimuth) | | | | | | | | |
|---|---|---|---|---|---|---|---|---|---|
| | 1 | 2 | 3 | 4 | 5 | 6 | 7 | 8 | etc |
| 1 | | | | | | | | | |
| 2 | | | | | | | | | |
| 3 | | | | | | | | | |
| etc | | | | | | | | | |
| 17 | | | | | | | | | |
| 18 | | | | | | | | | |
| 19 | | | | | | | | | |
| etc. | | | | | | | | | |

FIG. 5B

IMAGE-BASED COMPRESSION OF LIDAR SENSOR DATA WITH POINT RE-ORDERING

FIELD

The present disclosure generally relates to the field of electronics. More particularly, an embodiment relates to image-based compression of Light Detection And Ranging (LIDAR) sensor data with point re-ordering.

BACKGROUND

Autonomous driving promises a world where a vehicle can transport its passengers from point A to point B with ultimate safety and with minimal human intervention.

To achieve these goals, many sensors may be used. LIDAR is one of the most important amongst these sensors, in part, because LIDAR can ensure safety for autonomous driving vehicles. Namely, LIDAR can accurately measure ranges by utilizing light in the form of a pulsed laser.

Accordingly, any improvements to LIDAR applications can significantly benefit the progression of autonomous driving solutions.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 4, 5A, 5B, and 6 illustrate sample information in tabular format, according to some embodiments.

DETAILED DESCRIPTION

Figure 1:
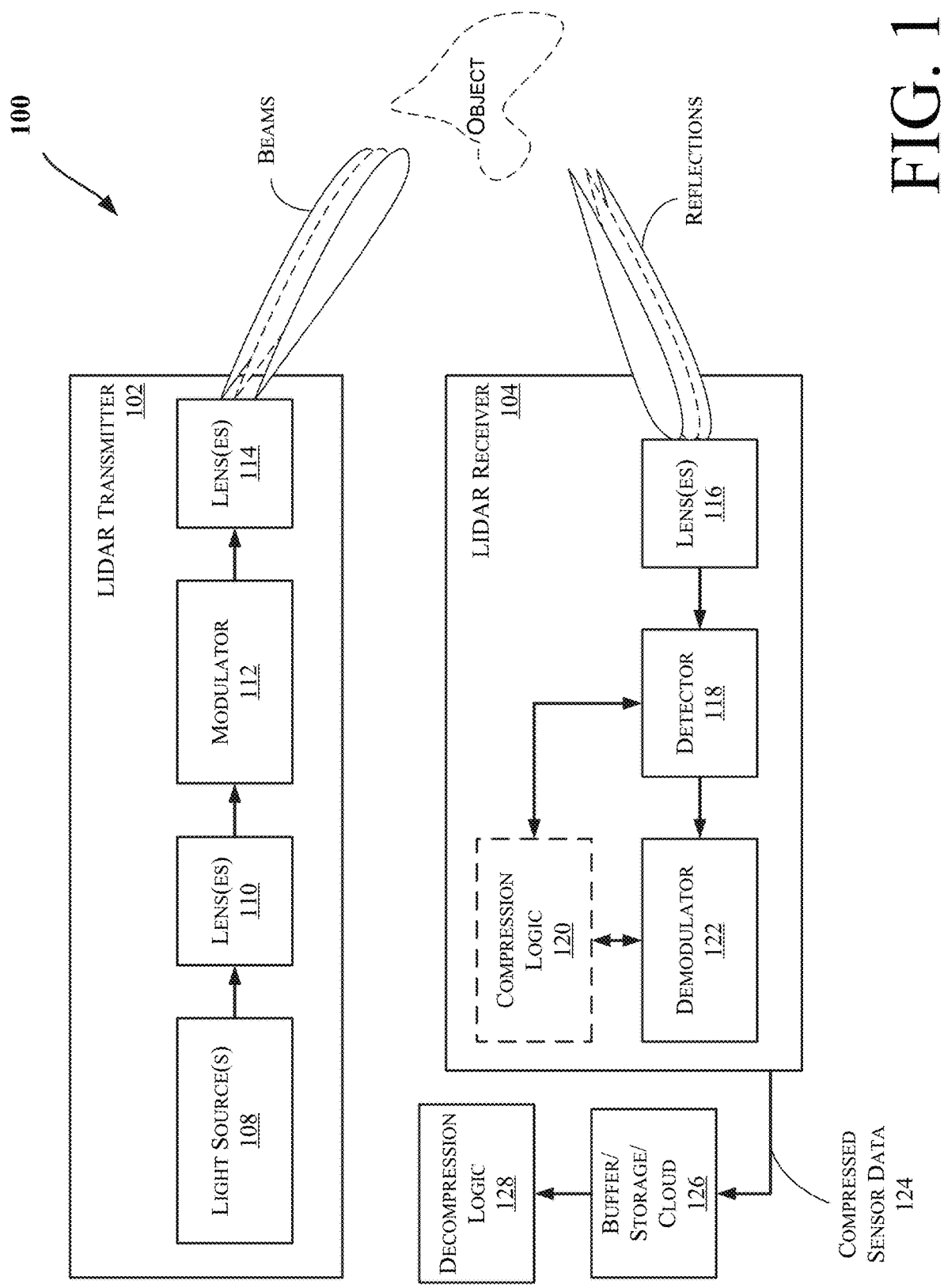
FIG. 1 illustrates a block diagram of a LIDAR system, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, autonomous driving promises a safer world. Operations of autonomous vehicles is highly dependent on sensors. LIDAR is one of the most important sensors to ensure safety for autonomous driving in part due to its angular resolution, accuracy and speed. Lidar sensors (also referred to as LIDAR or LiDAR) are used widely in autonomous driving vehicles to perceive the vehicle environment. A growing number of lidar sensors may be used in a single autonomous vehicle, and the resolution of lidar sensors is steadily increasing, resulting in a very large amount of sensor data being captured by each vehicle. For example, some high-end lidar sensors may generate on the order of a million of data points per second. This in turn creates potential issues or delays with storage and/or transmission of the LIDAR sensor data.

Moreover, some or all of this sensor data may need to be buffered on the vehicle, uploaded to a data center, and/or stored in the data center. In addition, some of the sensor data may have to be moved around within the data center or between data centers for various types of processing. The cost of storage and movement of such data is steadily increasing as the amount of generated data increases rapidly. Also, while in the case of camera data, there is a set of compression technologies more or less available, such as image and video coding hardware and software, based on many years of research and development, standards development and wide deployment (JPEG, MPEG, H.26X, etc.), this is not the case for lidar sensor data. There is a lack of compression tools for point cloud data in general, and lidar sensor data in particular. There are also no broadly accepted industry standards for such compression, and there is undoubtedly much room to improve compression performance. Hence, there is a growing need for compression of sensor data, including lidar data, which is addressed by some embodiments discussed herein.

More particularly, some embodiments relate to image-based compression of Light Detection And Ranging (LIDAR) sensor data with point re-ordering. In an embodiment, logic organizes and packs lidar sensor data into a two dimensional (2-D or 2D) image array and subsequently uses an image compression technique to compress the sensor data. In another embodiment, a data pre-processing operation may be performed to re-order lidar data points based a given sensor scanning order and a given point scanning order used during encoding/compression.

In one embodiment, logic used to compress and/or decompress the LIDAR pulses/signals/data is mounted or otherwise physically coupled to a vehicle. As discussed herein, a "vehicle" generally refers to any transportation device capable of being operated autonomously (with little or no human/driver intervention), such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle.

As will be further discussed herein (e.g., FIGS. 2-13), logic may be utilized to compress/decompress the LIDAR data to permit more efficient storage utilization as well as reducing the bandwidth requirements/use for transfer/storage of such data. This in turn would enhance safety/efficiency/performance/responsiveness for autonomous driving systems.

FIG. 1 illustrates a block diagram of a LIDAR system 100, according to an embodiment. System 100 includes a LIDAR transmitter 102 to generate and transmit a LIDAR beam and a LIDAR receiver 104 to receive/detect reflection of the LIDAR beam. In an embodiment, the LIDAR beam is in the form of a pulsed laser to measure the distance between an object and the LiDAR receiver 104 based on detection of the reflection of the transmitted beam.

LIDAR transmitter 102 includes one or more light sources 108 (e.g., to generate a laser beam), optionally lens(es) 110 (e.g., to adjust the light beam generated by the laser source(s) 108), modulator 112 (e.g., to modulate the generated light beam), and optionally lens(es) 114 (e.g., to adjust the light beam prior to transmission of the beam towards an object). The light source(s) 108 may include various types of laser light sources such as a pulsed diode laser source, uncooled fiber laser source, solid-state laser, liquid-crystal laser, dye laser, gas laser, etc. In some embodiments, one or more optical filters (not shown) may also be provided (in proximity to (or even embedded with) the optional lenses 110 and/or 114), e.g., to filter light beams in accordance with environmental characteristics (such as filter(s) to ensure correct operation in bright/sunny environments and/or to enable light beams to travel further).

Modulator 112 may modulate the light beam generated by the source(s) to modulate the beam's phase, frequency, amplitude, polarization, or any combinations thereof. In an embodiment, modulator 112 modulates the light beam based at least on input from other logic (not shown). Furthermore, modulator 112 may be an electro-optic modulator (e.g., including a lithium niobate crystal electro-optic modulator, liquid crystal electro-optic modulator, and the like) in some embodiments.

LIDAR receiver 104 includes optional lens(es) 116 (e.g., to adjust the light reflection received from an object), detector logic 118 (e.g., to detect the LIDAR beam reflection), demodulator 122 (e.g., to demodulate the generated light beam reflection), and compression logic 120 (e.g., to cause compression of the detected reflection beam (or LIDAR sensor data with point re-ordering) as will be further discussed herein, e.g., with reference to other figures). Compression logic 120 may communicate with detector 118 and/or demodulator 122 to facilitate compression of the LIDAR sensor data after it is detected and/or demodulated.

While FIG. 1 may show the compression logic 120 inside the LIDAR receiver and the decompression logic 128 outside the LIDAR receiver, both these logic may be provided elsewhere (for example, the compression logic may be provided outside of the LIDAR receiver and the decompression logic may be provided inside the LIDAR receiver). Also, in some embodiments, the lidar unit may include a processor/CPU/controller/FPGA (Field-Programmable Gate Array) that may run/perform other data processing functions, such as data corrections, packetizing data for communication (e.g. by Ethernet cable) to a host computer. In an embodiment, a processor/CPU/controller/FPGA may perform the compression and/or decompression. Alternatively, a host (e.g., separate or standalone) computer may include/perform the compression and/or decompression operations. In the latter case, the sensor unit may be integrated with a vehicle as is, and is coupled to a host computer or controller in the vehicle. Then, raw data can be obtained from the sensor(s) through an interface, and compression would be a processing step performed on the host computer/controller in the vehicle.

As shown in FIG. 1, compressed sensor data 124 (e.g., generated by compression logic 120 in an embodiment) may be stored in a buffer, cloud, or other storage device 126, e.g., for future access (e.g., after decompression by decompression logic 128) as further discussed herein with reference to FIGS. 2-7. Also, while LIDAR transmitter 102 and receiver 104 are shown as separate logic in FIG. 1, one or more embodiments combine these logics into the same logic. In an embodiment, compression logic 120 and/or LIDAR receiver 104 include one or more processors such as those discussed herein with reference to FIGS. 8-11. Also, compression logic 120 (and/or decompression logic 128 that decompresses the data stored in 126) may utilize hardware accelerators, field-programmable gate arrays, or dedicated application-specific processing hardware for faster compression/decompression operations as well as detect more complicated compression/decompression scenarios.

Furthermore, LIDAR can accurately measure ranges by utilizing light in the form of a pulsed laser. As discussed herein, a "laser" beam generally refers to electromagnetic radiation that is spatially and temporally coherent. Also, while some embodiments are discussed with reference to laser beams, other types of electromagnetic beams capable of detecting ranges or obstacle detection can also be used such as ultrasound, infrared, or other types of beams. LIDAR sensors typically measure ranges to objects in the environment by a process of scanning, that is, by modulating the direction of one or multiple laser beams across a range of azimuth angles and elevation angles and repeatedly taking distance/range measurements. This process of scanning the environment results in a series of distance/range measurements in a particular order, which depends on the specific scanning pattern.

Moreover, a first solution to efficiently encode lidar sensor data may involve directly encoding raw distance data received from a lidar sensor. Lidar sensors measure distance to targets in the environment by emitting pulsed laser light and detecting the reflected pulses. These distance or depth measurements can be encoded directly. A second solution may be to represent the detected data as a point cloud data. As discussed herein, a "point cloud" data generally refers to a set of points in a three dimensional (3D or 3-D) space, where each point is specified by its three dimensional X, Y, Z position/coordinates. In the case of lidar data, the X, Y, Z position of each point can be calculated based on sensor calibration information that specifies at what angles (azimuth and elevation) the reflected laser light beam was received. In general, point cloud data can also be received from sources other than lidar, such as other types of depth cameras or by 3D reconstruction from multiple cameras. As an example of a compression method, encoding a point cloud using an octree decomposition falls into this class of solutions. Point cloud file formats such as PCD (Point Cloud Data) and LAS (LASer) also fall in this class.

However, at least one disadvantage of such approaches is that (e.g., for the first solution) the raw distance representation of the data is strongly dependent on the specific lidar sensor and its calibration information. This sensor calibration information is needed to calculate the X, Y, Z positions of the sensed points in the environment. Hence, this calibration information needs to be coded with the data. Another disadvantage is that the computational cost of calculation X, Y, Z positions from raw distance values is now on the decoder or user side, which may be a burden in some use cases. Moreover, another disadvantage of such approaches (like the second solution) is that they may only address the more general problem of point cloud compression. However, lidar sensor data is a subset of point cloud data and has a specific structure due to the scanning nature of the lidar sensing process. Hence, the two aforementioned approaches do not taken advantage of this structure, and forego potentially significant improvements to compression performance. In addition, some existing formats such as PCD represent X, Y, Z position values in floating point, which can be highly inefficient.

Figure 2:
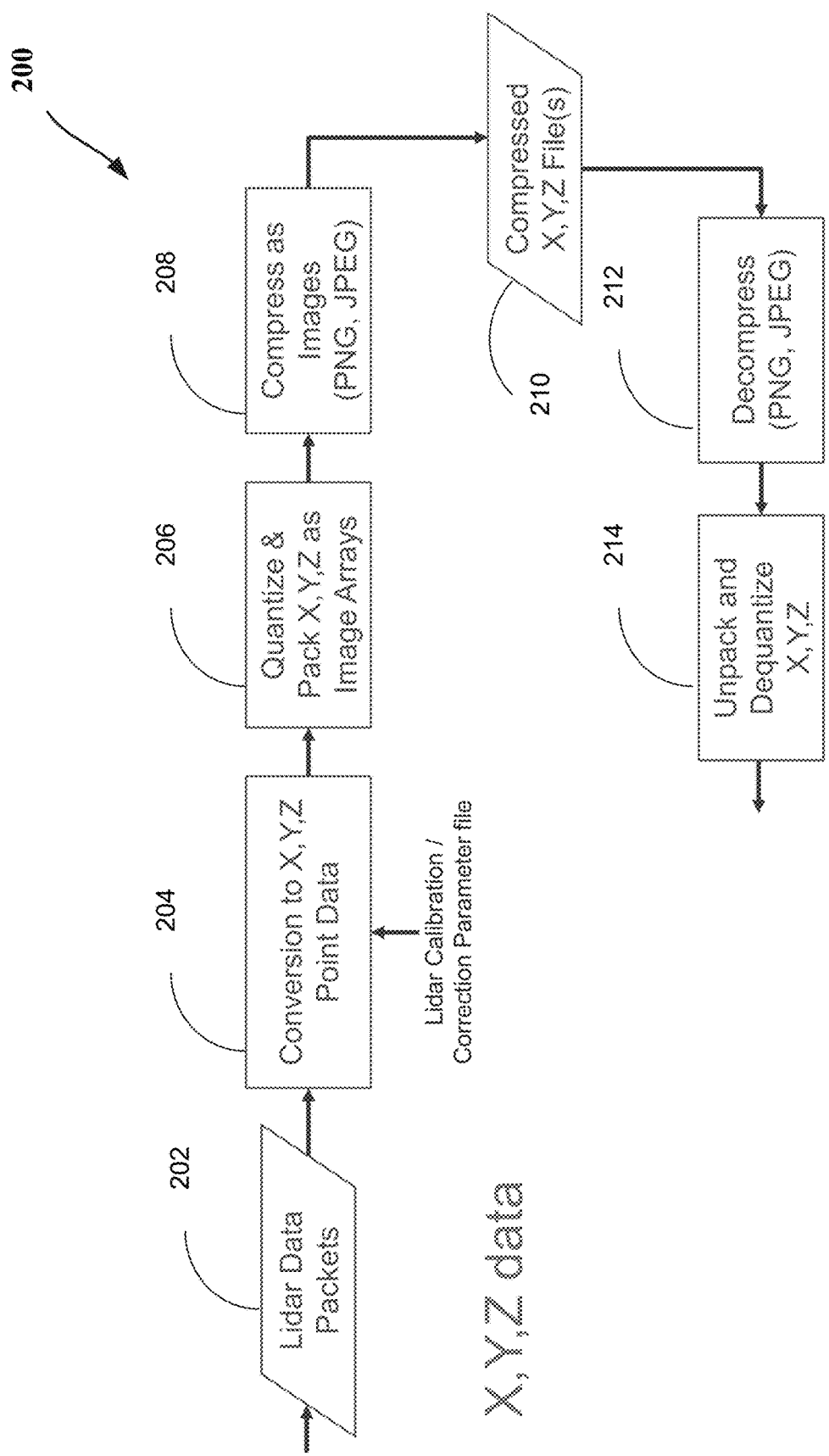
FIG. 2 illustrates a flow diagram of compression/encoding and decompression/decoding operations according to some embodiment.

FIG. 2 illustrates a flow diagram of compression/encoding and decompression/decoding operations according to some embodiment. In various operations, the operations discussed with reference to FIG. 2 are performed by one or more logic of FIG. 1 (including compression/decompression logic 120/128, storage 108, etc.).

Referring to FIGS. 1-2, operations for compression of lidar sensor data include: a) converting 204 raw distance data from the lidar sensor 202 to X, Y, Z point positions or point cloud data; b) quantizing 206 (or converting) X, Y, Z values from floating point to fixed point representation; c) packing/organizing 206 the X, Y, Z values into one or more two dimensional (2-D or 2D) arrays; and d) applying 208 an existing image compression/encoding method on the data in the 2-D array(s) such as JPEG, JPEG-LS (Joint Photographic Experts Group-Lossless) or PNG (Portable Network Graphics). The compressed data may then be store in storage 108 as discussed with reference to FIG. 1.

In some embodiments, the operations for decompression include: a) receiving one or more bit streams (or compressed image files 210) and applying the corresponding image decompression/decoding 212 method; b) unpacking 214 the X, Y, Z values from the decoded 2-D image array(s); and c) dequantizing 214 the X, Y, Z values and converting to floating point representation.

Moreover, by utilizing existing image compression technology that has been developed and proven over many years of research and development, standardization, and wide deployment, this approach reduces risks and potentially enables quicker adoption in the autonomous driving industry. Secondly, this approach reduces cost and complexity in the case of the autonomous driving application, since the same compression technology is potentially applied to both the camera and lidar data. Thirdly, this helps as significant prior investments in standard image compression technology can be utilized.

Further, by packing lidar data into a 2-D image array and utilizing image compression techniques, this approach exploits 2-D correlation between the samples of lidar data. This leads to a higher compression ratio, compared to methods that treat the lidar data samples as an unorganized point set or as a one dimensional (1-D) series of samples. Higher compression ratios mean that higher performance solutions may be offered to customers. In some implementations, lidar data from automotive lidar sensors are essentially scans across two degrees of freedom (azimuth and elevation). Due to the specific structure of such lidar scans, it is relatively simple to pack the data in a 2-D grid or array. Subsequently, a very low complexity image compression method such as JPEG-LS or PNG can be used. Again, this reduces cost of autonomous driving applications.

As described above, the need for data compression in the autonomous driving industry is growing. This includes in particular compression of image and/or video data, lidar data, and map data. Two specific use cases for lidar data compression and corresponding requirements are as follows:

I. Use Case I
Lidar sensor data stream storage and upload from vehicle to datacenter
Compression requirements:
Lossless or near-lossless (loss is imperceptible to AD -continued (Autonomous Driving) algorithms)
Real-time encoding
Computational cost of encoding kept below some bound/threshold
II. Use Case II:
Remote visualization of lidar data for manual ground-truth labeling
Compression requirements:
High-quality lossy coding is acceptable
Real-time decoding
Computational cost of decoding kept below some bound/threshold One aspect specific to lidar data associated with autonomous vehicles is the dynamic range of the data values. Distances and corresponding X, Y, Z position values may use a precision of about 1 mm, while ranging up to about 100/200 m. This means a dynamic range of about $10^5$ needs to be represented, or about 16 bits of precision. As a comparison, image pixel data is commonly in the range of 0-255, or 8 bits per pixel. A lidar compression format needs to be capable of representing this high dynamic range. At the same time, to obtain high compression ratio, the format should not unnecessarily waste bits beyond what is required.

To address this, in another embodiment, the aforementioned techniques may be further enhanced by including another lidar data pre-processing step during encoding that can significantly improve compression performance. Higher compression ratios translate directly into higher performance solutions and/or solutions with lower cost, e.g., lower cost of storage of lidar data and/or transmission of lidar data, as well as a lower cost of encoding/decoding hardware solutions. The additional step includes re-ordering lidar data points based on a given sensor scanning order and a given point scanning order used during encoding/compression. This can be achieved without additional processing during decoding/decompression as further detailed below.

Furthermore, the proposed steps for compression/encoding of lidar sensor data consist of: a) converting raw distance data from the lidar sensor to X, Y, Z point position (e.g., at operation 204); b) quantizing and converting X, Y, Z values from floating point to fixed point representation (e.g., at operation 206); c) re-ordering data points (e.g., after quantizing and prior to packing in operation 206); d) packing the X, Y, Z values into one or more 2-D arrays (e.g., at operation 206); and e) applying an existing image compression/encoding method on the data in the 2-D array(s) such as JPEG-LS or PNG (e.g., at operation 208).

The corresponding steps for decompression/decoding consist of: a) receiving one or more bit streams (or compressed image files from 210) and applying the corresponding image decompression/decoding method (e.g., at operation 212); b) unpacking the X, Y, Z values from the decoded 2-D image array(s) (e.g., at operation 214); and c) dequantizing the X, Y, Z values and converting to floating point representation (e.g., at operation 214).

As discussed with reference to FIG. 2, operations for compression/encoding of lidar sensor data are as follows in accordance with at least one embodiment: (a) converting raw distance data from the lidar sensor to X, Y, Z point positions; (b) quantizing X, Y, Z values and converting from floating point to fixed point representation; (c) packing the X, Y, Z values into one or more 2-D arrays; and/or (d) applying an existing image compression/encoding method on the data in the 2-D array(s) such as JPEG-LS or PNG.

In various embodiments, details for each operation are as follows:

(a) The conversion of raw distance values coming from the lidar sensor data to X, Y, Z point positions is dependent on the specific lidar sensor and its calibration information. For example, for a Velodyne® lidar sensor with 16-beam, 32-beam or 64-beam sensor, laser pulses are emitted at specific azimuth angles and elevation angles. These angles are specified by a sensor calibration file as well as parameters in the raw lidar data stream (e.g., such as illustrated in FIG. 2 as input to operation 204). After conversion to X, Y, Z data, this parameter data is no longer needed.

(b) Coding individual X, Y, Z position values into fixed point representation is more efficient and more precise compared to floating point representation. As mentioned above, these values have a relatively high dynamic range. For example, the precision of lidar sensors typical in autonomous vehicles can be on the order of 1-2 cm. This precision may improve; however a precision of 1 cm or 1 mm is likely sufficient. Conversion of floating point to fixed point values can use any suitable quantization method. One technique with very low complexity includes uniform quantization across the range of possible values. As an example, to uniformly quantize X, Y, Z values to 1 cm accuracy, each individual floating point value (where 1.0 typically corresponds to 1 meter) is multiplied by 100 and subsequently rounded to the nearest integer. A suitable offset may be added to handle negative values. As an example, the resulting values can be represented by 16 bits. Representations with fewer or more than 16 bits can also be used depending on the implementation.

(c) The goal of this operation is to "pack" the X, Y, Z position values into one or more 2-D array(s) that can be directly encoded by available image compression methods in the next step. Packing the X, Y, Z position values into 2-D arrays can be relatively low overhead in the case of lidar data. A lidar scan in itself is organized already on a grid, namely across a grid of azimuth and elevation directions. For example, a scan from a Velodyne HDL-32 sensors includes 32 "rows" of data, where each "row" may contain about 1850 samples. Although the position values themselves are points in 3-D space, the scan has a grid structure. Hence, the X, Y, Z values simply can be moved to 2-D "image-like" arrays in 1-to-1 fashion without problem. A few basic options exist, similar to the options by which natural R, G, B images are stored in 2-D arrays. A first option is to pack X values into a single 2-D array, pack Y values into a 2-D array, and pack Z values into a 2-D array. This is similar to encoding the R, G, and B "channels" of a natural image into 3 arrays. A second option is to pack X, Y and Z values in interleaved manner in the same row of the same array, i.e. X00, Y00,Z00,X01,Y01,Z01,X02,Y02,Z02, etc. This is similar to the way that R, G and B values for natural images can be stored in a single array, where values are interleaved on a sample basis. A third option is to pack X, Y and Z values in the same array, but interleaving on a line basis. This means a first line contains only X values, the next line contains only Y values, the next line contains only Z values, etc.

(d) The final operation is to apply an image compression method to the 2-D array(s) generated by the previous step. Existing image compression methods can be used for this operation. For the autonomous driving application, either lossless coding or near-lossless coding is used. Existing lossless coding standards such as Lossless JPEG, JPEG-LS or PNG can be used. Both JPEG-LS and PNG can encode samples with up to 16 bits of bit-depth. JPEG-XT (which extends JPEG with support for higher integer bit depths) is another image compression method that is capable of lossless coding of high dynamic range data such as 16 bit data. JPEG-XS is another image compression method capable of lossless and near-lossless coding. JPEG-XS (e.g., in accordance with ISO/IEC 21122) provides a compression algorithm with very low latency and very low complexity. In addition, the intra frame coding component of video coding methods such as H.264/AVC or H.265/HEVC may be used. As another example, HEIF (High-Efficiency Image File format) may be used. Other suitable image or video coding methods may also be used as long as they satisfy the considerations for lidar data.

Figure 3:
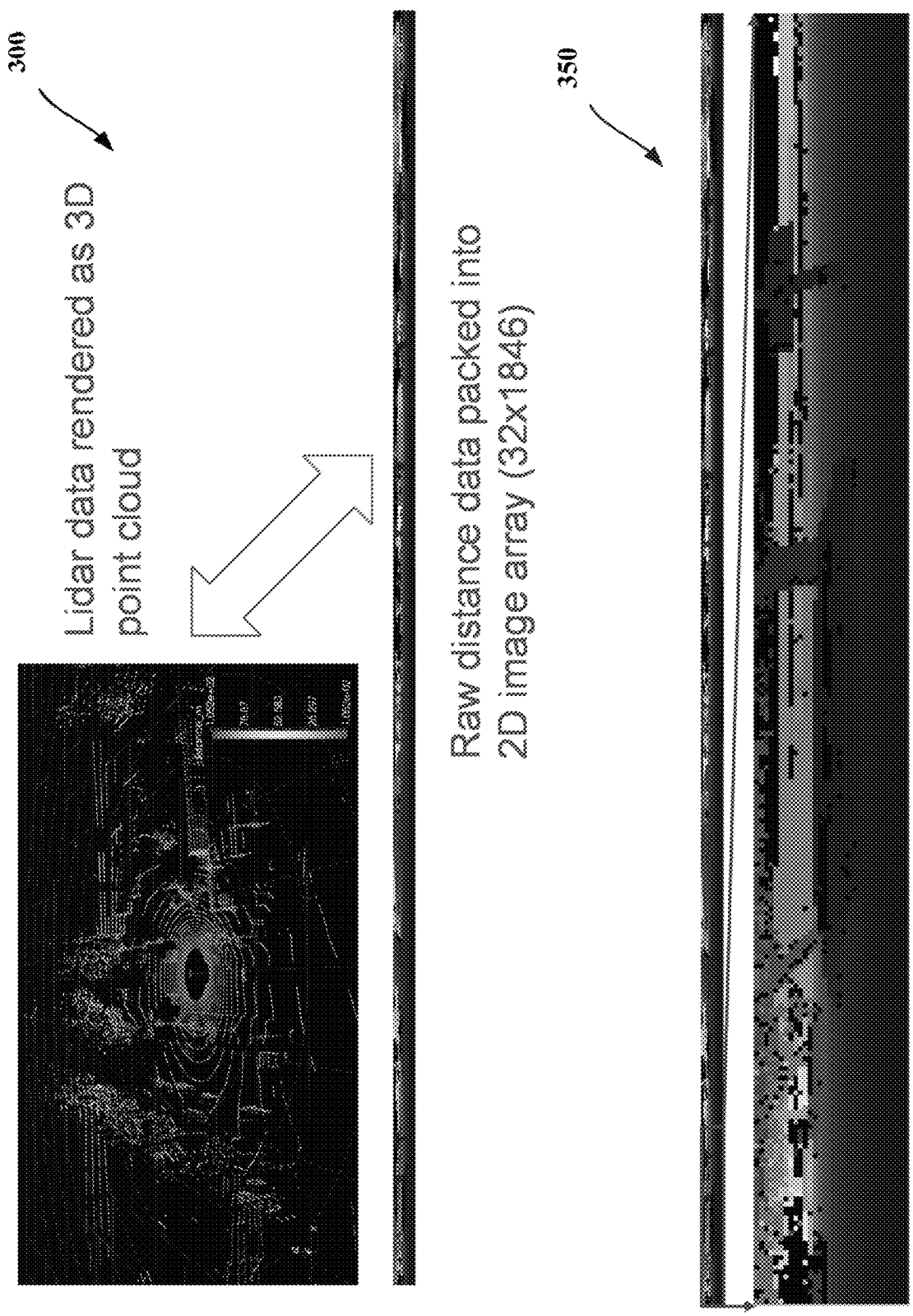
FIG. 3 shows sample images illustrating portions of a 2-D array with Y coordinate values obtained from lidar sensor data, according to an embodiment.

The output of the compression steps provides one or more compressed file(s) or bitstream(s) in a standard format (e.g. JPEG-LS or PNG format). The images of FIG. 3 show examples of part of a 2-D array with Y coordinate values obtained from lidar data from a Velodyne HDL-32 lidar sensor. The Y coordinate data has been visualized as a grayscale image 300 and contrast-enhanced 350 to more clearly visualize the content. In this visualization, mid-grey brightness values correspond to Y values near 0, darker brightness values (near black) correspond to large negative Y values and lighter brightness values (near white) correspond to large positive Y values. The height of this image is 32 pixels, corresponding to the 32 laser beams of the sensor. A single row in the image corresponds to a series of lidar measurements of a single laser beam as it is scanning the environment around the sensor.

In addition to X, Y, Z position data, lidar and point cloud data may include additional attributes, for example each point may have an associated intensity or reflectance value, or an RGB color value. While some embodiments discuss the X, Y, Z position data, a similar approach can be used to encode such additional point attribute data. This would result in additional encoded "images". Lidar sensor data contains invalid returns, i.e. data points where the sensor received a very weak or essentially no return signal. One option is to simply encode these data points as zeros (0,0,0), in other words X=Y=Z=0, which signals to the decoder/ decompression logic that the sample is actually invalid. Normally, returns with all zeros (0,0,0) do not occur in the data. Another option is to encode a bitmask that flags which data points are invalid as a separate component. Many image coding formats have the capability to include such a bitmask already, so no additional new compression methods are required to enable this.

As discussed with reference to FIG. 2, in some embodiments, the steps for decompression/decoding are as follows. (a) receiving one or more bit streams (or compressed image files) and applying the corresponding image decompression/ decoding method; (b) unpacking the X, Y, Z values from the decoded 2-D image array(s); and (c) dequantizing the X, Y, Z values and (if needed) converting from fixed point to floating point representation.

Details for each decompression/decoding operation is as follows according to one or more embodiments:

(a) The method used for decoding naturally mirrors the method used for encoding. For example, the JPEG-LS decoding method may be used to obtain 2-D "image" arrays containing X, Y, Z position values.

(b) The X, Y, Z position values can simply be read out from the 2-D "image" arrays based on the technique used for packing these values during encoding. For example, X values are read from a first array, Y values are read from a second array, and Z values are read from a third array. Or, if X, Y and Z values were stored in interleaved manner in a single array, they are to be read out in corresponding manner.

(c) The dequantization process of individual X, Y and Z values mirrors the technique used during encoding. For example, if uniform quantization is used, a floating point value can simply be obtained by dividing the fixed point value by the same scaling factor that was used during quantization. For example, if the fixed point value represents an X, Y or Z value in integer cm, it is simply divided by 100.0 to obtain a floating point value in meter units. A suitable offset may be added back or subtracted as well.

The table in FIG. 4 shows sample results of image-based compression of lidar sensor data using a software prototype, compared to several alternative methods. The results were averaged over 100 scans (about 10 sec) of a lidar data set taken with a Velodyne HDL-32E on a moving vehicle. These results only consider the geometry data (X, Y,Z coordinates or distance/range data), excluding other attributes, such as reflectance or color.

Referring to FIG. 4:
PCD (Point Cloud Data) format can be very inefficient, especially the ASCII (American Standard Code for Information Interchange) version. The binary and binary-compressed versions of PCD are more efficient than the ASCII version, using about 10-12 bytes per point.
LAS. Uncompressed LAS represents each point with a fixed 20 bytes. It was designed for remote sensing applications, not for streams of automotive lidar scans. Although it can hold Velodyne sensor data, it is relatively inefficient.
LAZ (LAS zip compression of LAS). LAS zip was designed specifically for compressing LAS files. LAS zip compresses LAS files by about 5×, down to about 4.2 byte/point, and is lossless.
Image-based coding, with X, Y and Z data each packed into a separate image.
  a. PGM (Portable Gray Map) is an uncompressed image format and represents the data in 2 byte per pixel, resulting in 6 bytes per lidar point (3 images for X, Y and Z).
  b. Applying gzip (lossless) to the PGM images results in about 2.8 bytes per lidar point.
  c. Applying PNG and JPEG-LS on the images both result in about 2 bytes per point. This can provide one of the best performance among this group of methods.
  d. ZFP is an alternative compression methods designed for arrays of floating point numbers. Its compression performance is not as good as that of PNG or JPEG-LS.
For comparison, additional results are reported for coding raw distance/range values (2 bytes per point) packed into a single image array, and then compressing it with gzip, PNG or JPEG-LS. This resulted in about 1 byte per point.

In some embodiments, an existing image compression method such as Lossless JPEG, JPEG-LS, JPEG-XT, JPEG-XS, HEIF, or PNG can be used, especially if lossless coding and high bit-depth encoding (for example 16 bit) are required. Other suitable image and video compression methods that support the requirements of automotive lidar data may also be used.

Generally, image (and video) compression methods scan the data samples (pixels in the case of image data) in a particular order. For example, one method is to scan the image row by row from top to bottom, and pixel by pixel from left to right. Another method may be to process the image block by block and scan the samples (pixels) within each block in a top-left to bottom-right or other order. Furthermore, compression methods may utilize some form of spatial prediction technique in combination with encoding of the prediction-error. The operation of the spatial prediction technique can be dependent on the scanning order. Prediction may only use samples for prediction that have already been visited in the scanning order and have been encoded previously. As an example, image compression methods may use one or more pixels to the left and to the top of the current pixel to encode the value of the current pixels with a predictive technique. The scanning order and prediction technique can have a very large impact on the compression performance and are generally designed to exploit the correlation between pixels in typical image data.

To this end, in one embodiment, in order to increase the compression ratio when using an existing image compression method for compressing lidar sensor data, the order of lidar data points can be adapted to the known scanning order and prediction methods used in the image encoder. The proposed lidar sensor data compression method encodes the X, Y and Z coordinate position values of detected points. The process that utilizes the lidar points may not care about the order of the points; in this case, their order does not have to be preserved during encoding. After encoding and decoding point positions in lossless manner, their X, Y and Z values will be the same, no matter in what order the points were encoded. However, as mentioned above, the order of data points has a significant impact on the compression performance. This same technique may be applied to additional attributes associated with each data point, such as intensity, reflectance or color attributes. The order in which the lidar sensor generates or provides data points may not be the order that results in the highest compression performance. In other words, higher compression performance can be achieved by changing the order in which the data points are provided to the image-based compression stage in one embodiment. This re-ordering of the data points can be implemented as a separate step or can be implemented as part of the process of packing the data into a 2-D image grid, as indicated in the above.

As an example, a Velodyne lidar sensor may have an upper set of lasers and a lower set of lasers. The order in which the lasers are fired may be interleaved, and the data samples may be output in alternating manner, e.g., a sample from a laser in the upper set may be followed by a sample from a laser in the lower set, followed by a sample from the next laser in the upper set, followed by a sample from the next laser in the lower set. Although the samples can be packed into a 2-D image grid in the order that the sensor provides them and encoded in lossless manner, this order will not result in the best compression performance. To increase compression performance, it is much better to undo the interleaving of samples in such a way that subsequent samples from the same laser (at the same elevation) are placed in adjacent locations in the 2-D image grid (in one direction), and so that samples from lasers in adjacent positions on the sensor at the same azimuth are also placed in adjacent locations in the 2-D image grid (in the perpendicular direction).

For example, adjacent samples from the same lidar laser (at the same elevation) can be placed adjacent into a single image row. Since subsequent measurements from the same laser are expected to be correlated in most instances, such adjacent placement in the image can be exploited by the image compression engine to improve the compression performance. Note that the image compression engine attempts to predict a current sample based on adjacent samples previously encoded. Using adjacent samples with better correlation to the current sample will result in better prediction, and a smaller prediction error. Smaller prediction errors generally require fewer bits to encode. In addition, samples can be placed into the 2-D image so that each subsequent row corresponds to the subsequent laser on the lidar sensor. In this case, samples in the same column in the image correspond to lidar data points measured at the same azimuth. Again, since measurements from adjacent lasers at the same azimuth angle are expected to be more correlated than measurements from non-adjacent lasers in most instances, such a placement in the image can be exploited by the image compression engine to improve compression performance. The image compression engine may attempt to predict a current sample in a current row of samples based on previously encoded samples in one or more adjacent rows. When the samples in the directly adjacent row or rows have better correlation to the samples in the current row, this will result in better prediction and smaller prediction errors. Generally smaller prediction errors require fewer bits to encode, and result in better compression. In the above example, the layout across rows and columns can be interchanged with a transposed but equivalent layout across columns and rows in another embodiment.

A sample order of lidar samples as scanned by a Velodyne sensor is shown in the table of FIG. 5A, illustrating the interleaved pattern. In accordance with an embodiment, a sample order for encoding by an image compression engine is shown in the table of FIG. 5B. Again, the choice of rows versus columns is arbitrary and the diagram could be transposed. Further, the specific example provided above describes changing the order of rows of data in a 2-D grid in a fixed manner. In a similar manner, the order of columns of data may be changed in a 2-D grid in a fixed manner. This is advantageous for data received directly from a lidar sensor, given prior knowledge of the data source. Other ways of re-ordering the rows and/or columns of the data over a 2-D grid can be defined and utilized depending on the implementation and/or data source.

Further ways of packing the data into a 2-D grid can be defined and utilized, for example by breaking up a single row of data points into multiple smaller rows (and/or likewise for columns). Any re-ordering of the data points that preserves the X, Y and Z values and additional attributes themselves, and preserves the relation between X, Y, Z and additional attributes for individual samples, may be defined.

In specific use cases, the precise source of lidar data may not be known. In this case, the above re-ordering can be applied adaptively, e.g., based on an order detection procedure. For example, the above interleaving pattern of the data as received from a lidar sensor can be detected with pattern detection operations. Subsequently, the proper re-ordering that optimizes compression performance can be applied. In many use cases, the ordering of the data points does not have to be preserved; hence, any change in the ordering does not have to be signaled to the decoder. In use cases where the ordering of the data has to be preserved, a specific choice for the encoding order of the data is encoded and sent to the decoder logic along with the data itself, so that the decoder logic can reconstruct the original ordering of the data. Alternatively, a hint (e.g., a bit of data) may be sent with the data to inform the decoder logic regarding presence or absence of ordering choice and the decoder logic can then access the ordering information (e.g., stored elsewhere) in response to the detection of the hint. In an embodiment, the hint may encode the selection amongst a pre-defined set of re-orderings. This hint can be carried in the image file as user information outside of the core image bit elements themselves. Most image and video file formats support inclusion of non-standardized user information. Such information may also be conveyed outside of the file format or bit stream format itself.

In addition, the different modes of re-ordering and packing of lidar data samples can be applied in different areas of the 2-D image grid. For example, the lidar data can be processed in block-by-block manner, e.g. blocks of lidar samples of width M and height N. Different orderings of the data (as described above) can be considered different coding modes. The encoder can switch between these coding modes (i.e., different orderings) adaptively, on a block-by-block basis. Again the decision to select a specific ordering (coding mode) can be made using pattern detection operations or may be based on estimates of the number of bytes used by the image compression engine to represent that part of the data. Further, the above principle and methods may be applied to the geometry attributes associated with each data sample (such as X, Y and Z values), as well as to additional attributes (such as intensity, reflectance, or color values), if any.

The table of FIG. 6 shows sample results of image-based compression of lidar sensor data using a software prototype, comparing compression performance with and without re-ordering of data points. Results were averaged over 100 scans (about 10 seconds) of a lidar data set taken with a Velodyne HDL-32E on a moving vehicle. These results only consider the geometry data (X, Y,Z coordinates or distance/range data), excluding other attributes, such as reflectance or color. In this example, the specific re-ordering applied was to undo the interleaving of the data from the Velodyne sensor. This is a relatively simple re-ordering and further improvement can likely be achieved with more intelligent re-ordering.

For instance, using JPEG-LS as the compression engine, the point data can be represented by about 2.5 byte/point without applying de-interleaving (i.e. compressing the data as is). When applying de-interleaving of rows (re-ordering the points), the data can be represented by about 1.7 byte/point, resulting in about 30% bit savings. Other compression methods that do not exploit the 2-D correlation in the data may be insensitive to row re-ordering.

Figure 7:
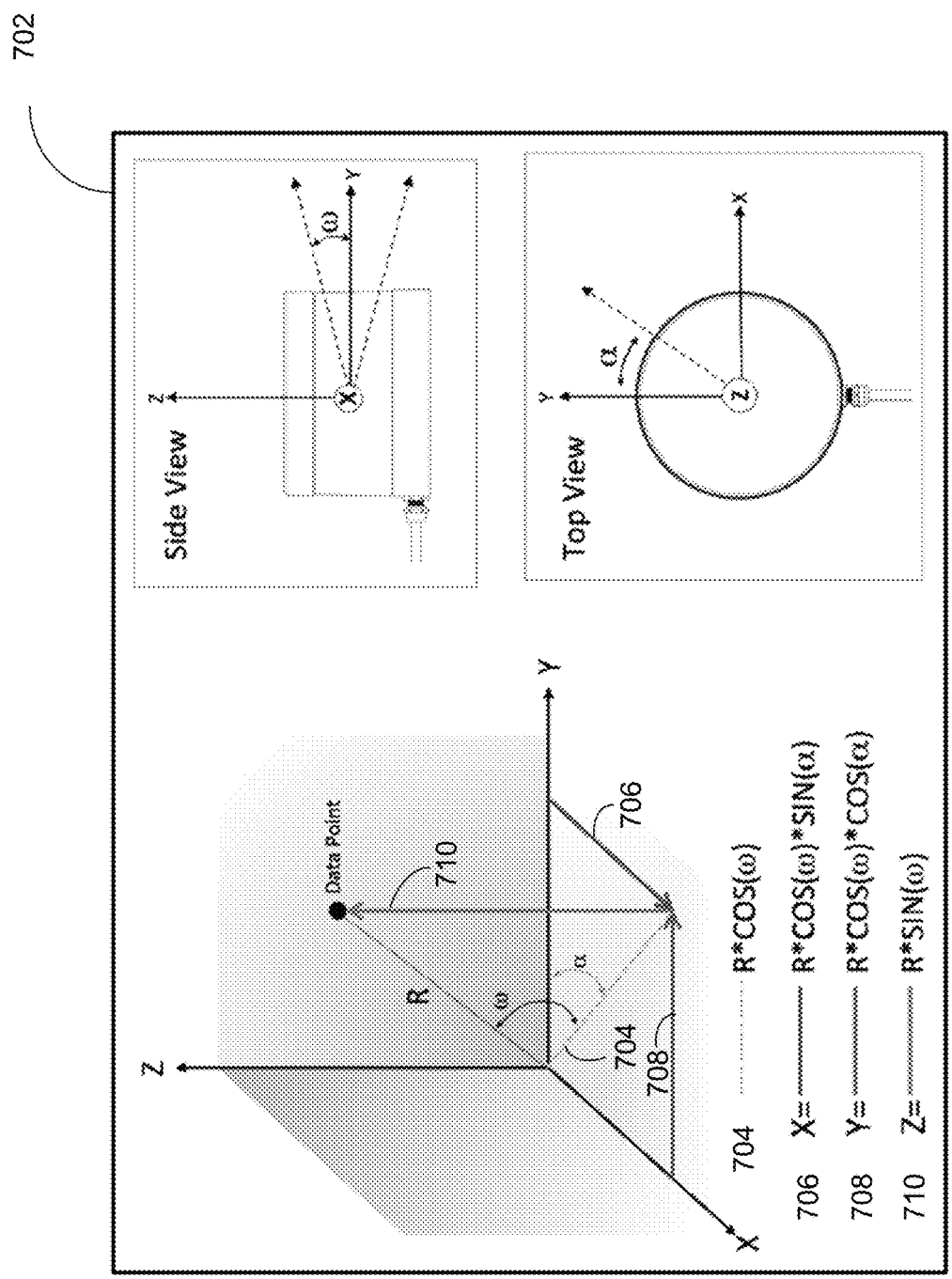
FIG. 7 shows an exemplary diagram and equations for conversion of raw lidar measurements into X, Y, Z values.

FIG. 7 shows an exemplary diagram and equations 702 for conversion of raw lidar measurements into X, Y, Z values. The angle alpha is commonly called azimuth, and the angle omega is commonly called elevation. The value R is the actual distance measurement that comes from the laser reflection time-of-flight measurement. As previously mentioned, the lidar sensor scans the environment on a grid to generate the raw data. In the case of Velodyne and several others, measurements at multiple elevation angles are taken by multiple (separate) laser beams. By mechanical motion, the device scans across a range of azimuth angles, and directs the lidar beams at varying azimuth directions. Regarding the conversion 702, this diagram shows the basic calculations, but in practice this conversion might involve more detailed calculations taking into account additional calibration factors. The conversion can be implemented by logic such as firmware and/or software. Some implementations discussed herein refer to Velodyne lidar sensors. However, the embodiments discussed herein are not intended to be limited to Velodyne lidar sensors.

Figure 8:
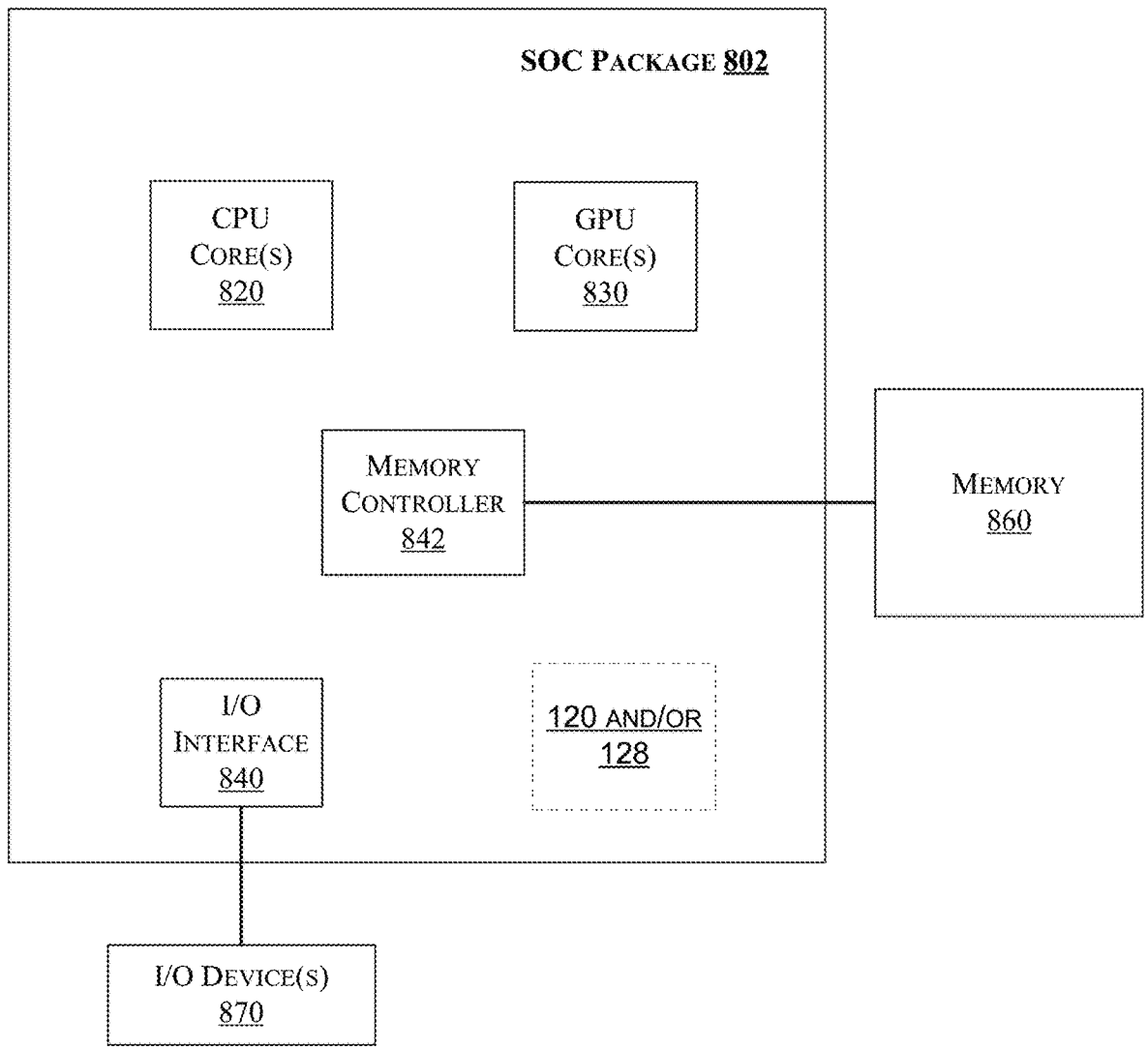
FIGS. 8 and 9 illustrates block diagrams of embodiments of computing systems, which may be utilized in various embodiments discussed herein.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
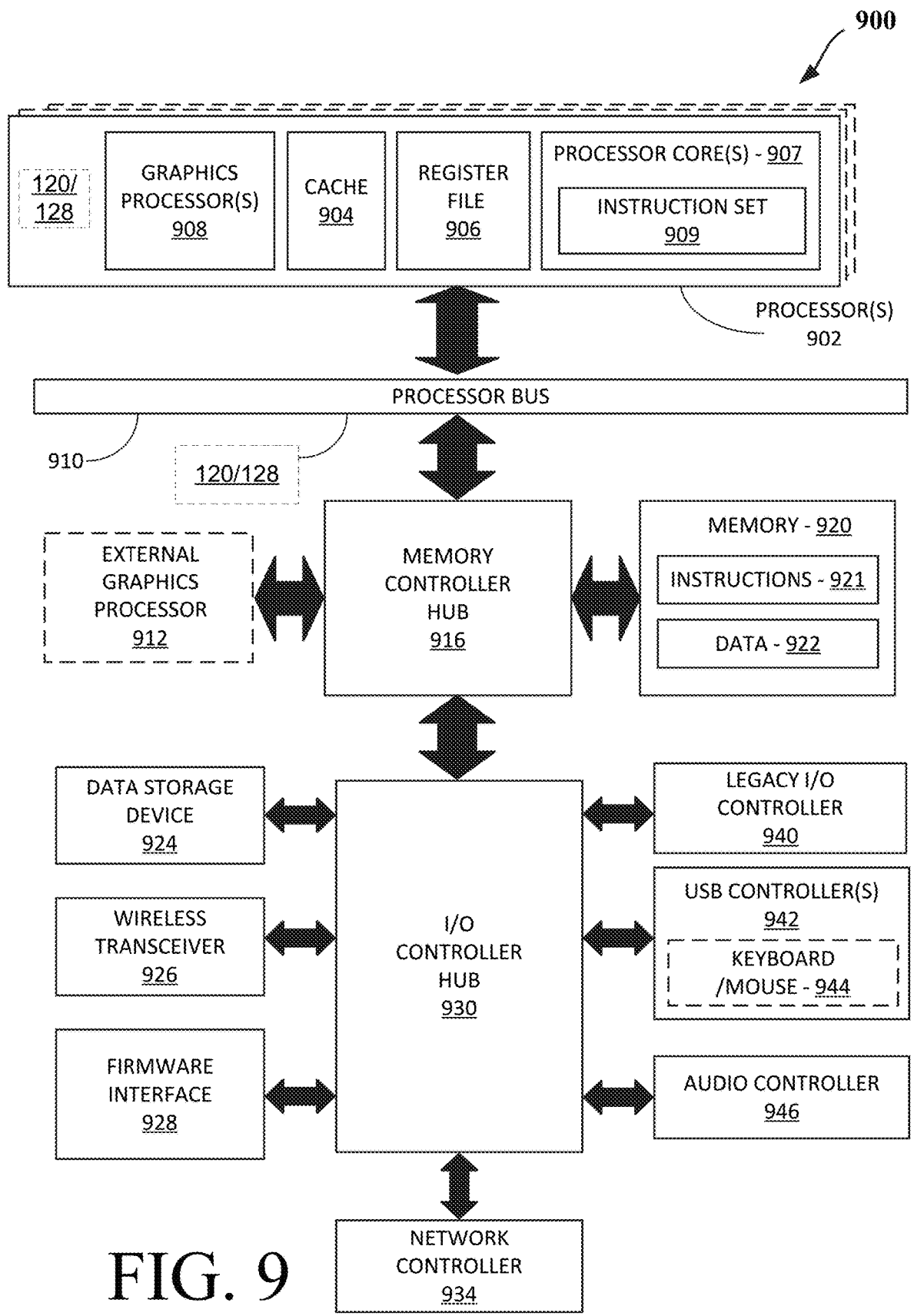

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
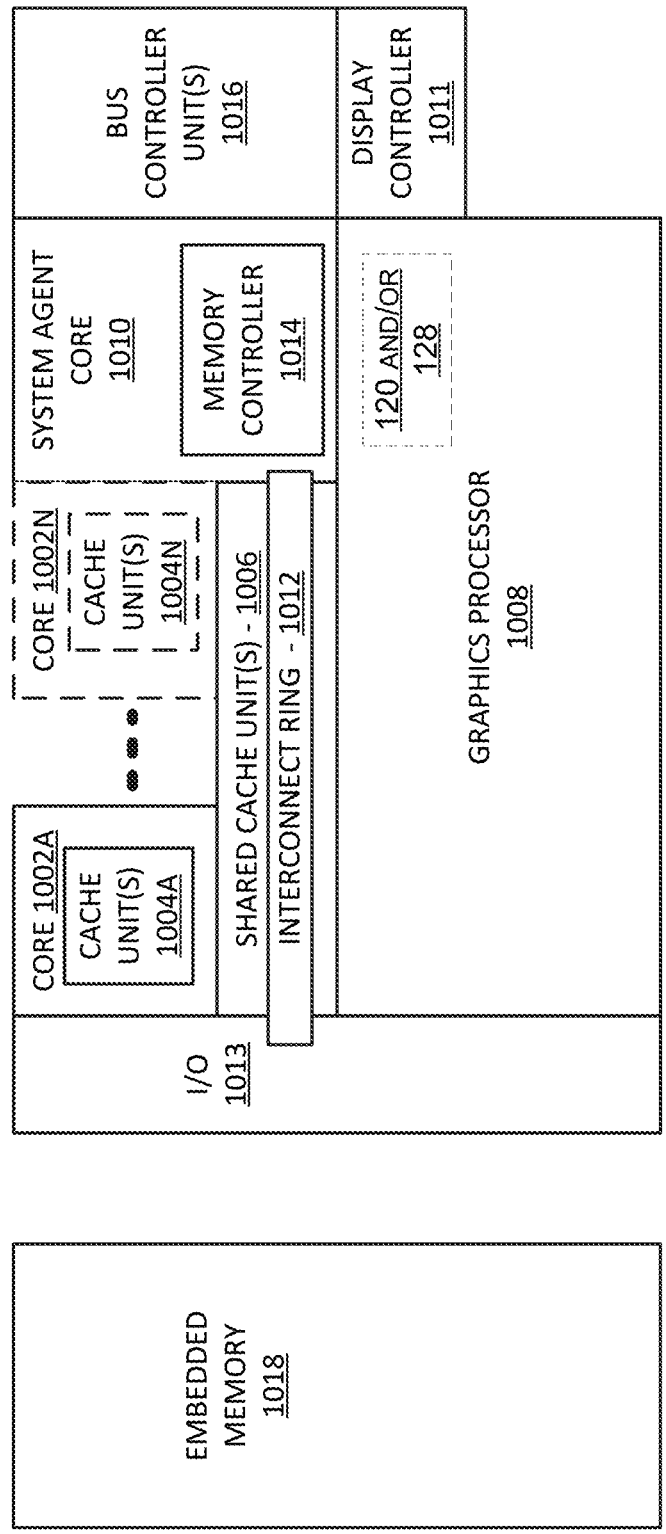
FIGS. 10 and 11 illustrate various components of processors in accordance with some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
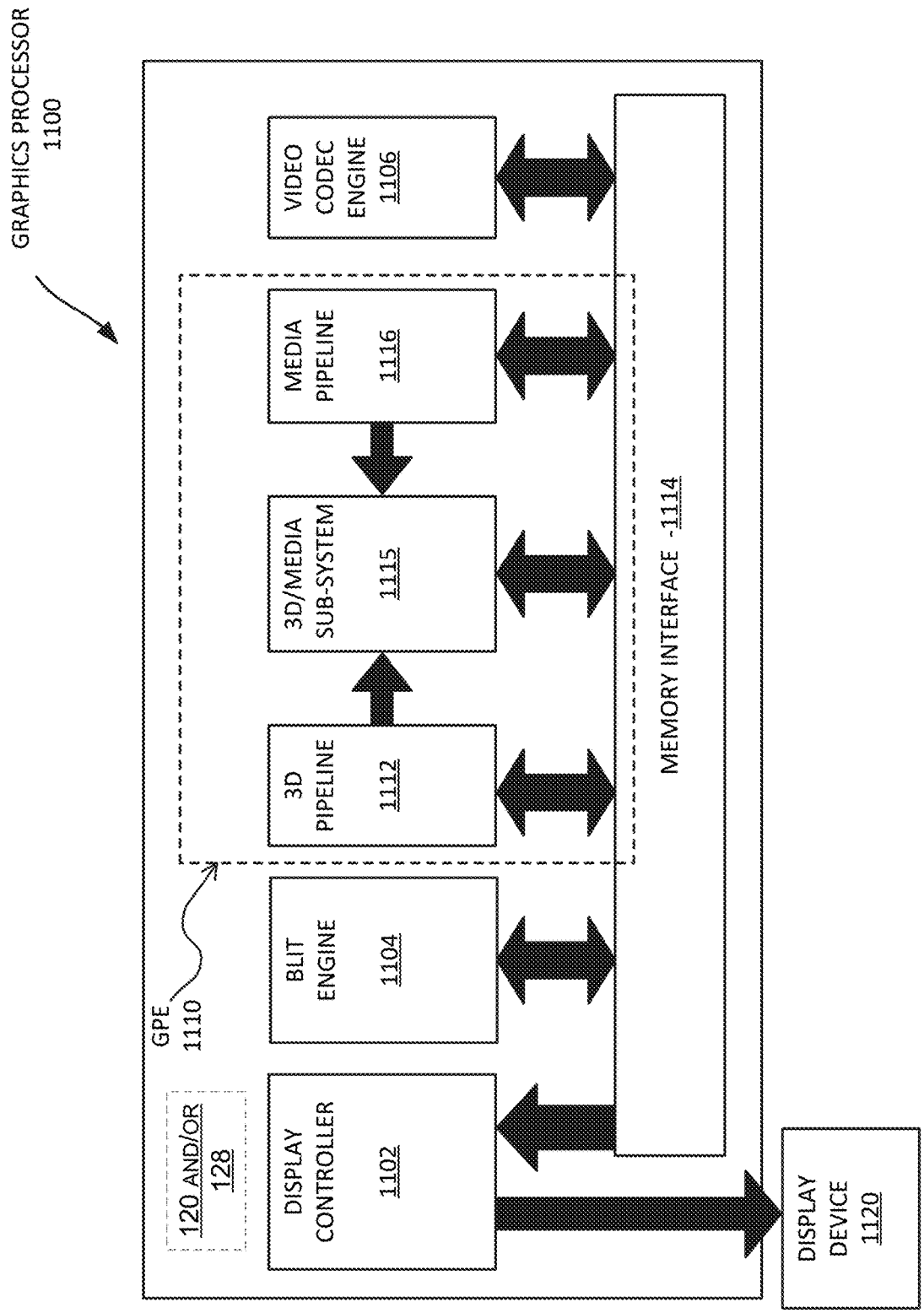

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 11D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media sub-system 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: logic circuitry to receive distance sensor data and convert the received distance sensor data to point cloud data, wherein the point cloud data corresponds to a set of points in a three dimensional (3D) space; and memory, coupled to the logic circuitry, to store a compressed version of the point cloud data, wherein the logic circuitry is to pack the converted point cloud data into one or more two dimensional (2D) arrays, wherein data stored in the one or more 2D arrays are to be compressed to generate the compressed version of the point cloud data. Example 2 includes the apparatus of example 1, comprising logic to re-order the converted point cloud data based on a scan order of the distance sensor data prior to packing or compression of the converted point cloud data. Example 3 includes the apparatus of example 1, comprising logic to re-order the distance sensor data prior to conversion to the point cloud data. Example 4 includes the apparatus of example 1, comprising logic to compress the point cloud data in accordance with JPEG (Joint Photographic Experts Group), JPEG-LS (JPEG-Lossless) compression, JPEG-XT (JPEG-Extended), JPEG-XS, PNG (Portable Network Graphics) compression, H.264/AVC intra coding or H.265/HEVC intra coding. Example 5 includes the apparatus of example 1, comprising logic to quantize the point cloud data from floating point to fixed point representation. Example 6 includes the apparatus of example 1, wherein the point cloud data is to be stored in the memory in a Point Cloud Data (PCD) format or LAS (LASer) format. Example 7 includes the apparatus of example 1, wherein the distance sensor data comprises one or more of: Light Detection And Ranging (LIDAR) sensor data, depth camera sensor data, or sensor data to be generated by 3D reconstruction from multiple cameras. Example 8 includes the apparatus of example 1, wherein each point of the point cloud data is to be specified by its three dimensional coordinates. Example 9 includes the apparatus of example 8, comprising logic to calculate the three dimensional coordinates based on sensor calibration information. Example 10 includes the apparatus of example 9, wherein the sensor calibration information is to specify an azimuth and an elevation of a reflected laser light beam. Example 11 includes the apparatus of example 1, wherein an Internet of Things (IoT) device or vehicle comprises the logic circuitry or the memory. Example 12 includes the apparatus of example 1, wherein a processor, having one or more processor cores, comprises the logic circuitry or the memory. Example 13 includes the apparatus of example 1, wherein a single integrated device comprises one or more of: a processor, the logic circuitry, and the memory.

Example 14 includes an apparatus comprising: logic circuitry to receive information including one or more bit-streams or one or more compressed image files and to unpack the received information, wherein the received information corresponds to a compressed version of point cloud data, wherein the point cloud data corresponds to converted distance sensor data, wherein the point cloud data corresponds to a set of points in a three dimensional (3D) space; and wherein the received information is packed into one or more two dimensional (2D) arrays, wherein data stored in the one or more 2D arrays are to be decompressed to generate the distance sensor data. Example 15 includes the apparatus of example 14, wherein the received information corresponds to a re-ordered version of the converted point cloud data, wherein the reordered version is re-ordered based on a scan order of the distance sensor data prior to packing or compression of the converted point cloud data. Example 16 includes the apparatus of example 14, comprising logic to decompress the received information in accordance with JPEG (Joint Photographic Experts Group), JPEG-LS (JPEG-Lossless) compression, JPEG-XT (JPEG-Extended), JPEG-XS, PNG (Portable Network Graphics) compression, H.264/AVC intra coding or H.265/HEVC intra coding. Example 17 includes the apparatus of example 14, comprising logic to de-quantize the point cloud data from fixed point to floating point representation.

Example 18 includes one or more computer-readable medium comprising one or more instructions that when executed on at least one processor configure the at least one processor to perform one or more operations to: receive, at logic circuitry, distance sensor data and convert the received distance sensor data to point cloud data, wherein the point cloud data corresponds to a set of points in a three dimensional (3D) space; and store a compressed version of the point cloud data in memory, wherein the logic circuitry is to pack the converted point cloud data into one or more two dimensional (2D) arrays, wherein data stored in the one or more 2D arrays are to be compressed to generate the compressed version of the point cloud data. Example 19 includes the one or more computer-readable medium of example 18, further comprising one or more instructions that when executed on the at least one processor configure the at least one processor to perform one or more operations to cause re-ordering of the converted point cloud data based on a scan order of the distance sensor data prior to packing or compression of the converted point cloud data. Example 20 includes the one or more computer-readable medium of example 18, further comprising one or more instructions that when executed on the at least one processor configure the at least one processor to perform one or more operations to cause re-order the distance sensor data prior to conversion to the point cloud data.

Example 21 includes one or more computer-readable medium comprising one or more instructions that when executed on at least one processor configure the at least one processor to perform one or more operations to: receive, at logic circuitry, information including one or more bit-streams or one or more compressed image files and to unpack the received information, wherein the received information corresponds to a compressed version of point cloud data, wherein the point cloud data corresponds to converted distance sensor data, wherein the point cloud data corresponds to a set of points in a three dimensional (3D) space; and wherein the received information is packed into one or more two dimensional (2D) arrays, wherein data stored in the one or more 2D arrays are to be decompressed to generate the distance sensor data. Example 22 includes the one or more computer-readable medium of example 21, further comprising one or more instructions that when executed on the at least one processor configure the at least one processor to perform one or more operations to cause decompression of the received information in accordance with JPEG (Joint Photographic Experts Group), JPEG-LS (JPEG-Lossless) compression, JPEG-XT (JPEG-Extended), JPEG-XS, PNG (Portable Network Graphics) compression, H.264/AVC intra coding, or H.265/HEVC intra coding. Example 23 includes the one or more computer-readable medium of example 18, further comprising one or more instructions that when executed on the at least one processor configure the at least one processor to perform one or more operations to cause de-quantization of the point cloud data from fixed point to floating point representation.

Example 24 includes an apparatus comprising means to perform a method as set forth in any preceding example. Example 25 comprises machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
logic circuitry to receive distance sensor data and convert the received distance sensor data to point cloud data, wherein the point cloud data corresponds to a set of points in a three dimensional (3D) space; and
memory, coupled to the logic circuitry, to store a compressed version of the point cloud data,
wherein the logic circuitry is to pack the converted point cloud data into one or more two dimensional (2D) arrays, wherein data stored in the one or more 2D arrays are to be compressed to generate the compressed version of the point cloud data, wherein the distance sensor data comprises depth camera sensor data.

2. The apparatus of claim 1, comprising logic to re-order the converted point cloud data based on a scan order of the distance sensor data prior to packing or compression of the converted point cloud data.

3. The apparatus of claim 1, comprising logic to re-order the distance sensor data prior to conversion to the point cloud data.

4. The apparatus of claim 1, comprising logic to compress the point cloud data in accordance with JPEG (Joint Photographic Experts Group), JPEG-LS (JPEG-Lossless) compression, JPEG-XT (JPEG-Extended), JPEG-XS, PNG (Portable Network Graphics) compression, H.264/AVC intra coding or H.265/HEVC intra coding.

5. The apparatus of claim 1, comprising logic to quantize the point cloud data from floating point to fixed point representation.

6. The apparatus of claim 1, wherein the point cloud data is to be stored in the memory in a Point Cloud Data (PCD) format or LAS (LASer) format.

7. The apparatus of claim 1, wherein the distance sensor data further comprises Light Detection And Ranging (LIDAR) sensor data.

8. The apparatus of claim 1, wherein each point of the point cloud data is to be specified by its three dimensional coordinates.

9. The apparatus of claim 8, comprising logic to calculate the three dimensional coordinates based on sensor calibration information.

10. The apparatus of claim 9, wherein the sensor calibration information is to specify an azimuth and an elevation of a reflected laser light beam.

11. The apparatus of claim 1, wherein an Internet of Things (IoT) device or vehicle comprises the logic circuitry or the memory.

12. The apparatus of claim 1, wherein a processor, having one or more processor cores, comprises the logic circuitry or the memory.

13. The apparatus of claim 1, wherein a single integrated device comprises one or more of: a processor, the logic circuitry, and the memory.

14. The apparatus of claim 1, wherein the distance sensor data further comprises sensor data to be generated by 3D reconstruction from multiple cameras.

15. An apparatus comprising:
logic circuitry to receive information including one or more bit-streams or one or more compressed image files and to unpack the received information, wherein the received information corresponds to a compressed version of point cloud data, wherein the point cloud data corresponds to converted distance sensor data, wherein the point cloud data corresponds to a set of points in a three dimensional (3D) space; and
wherein the received information is packed into one or more two dimensional (2D) arrays, wherein data stored in the one or more 2D arrays are to be decompressed to generate the distance sensor data, wherein the distance sensor data comprises depth camera sensor data.

16. The apparatus of claim 15, wherein the received information corresponds to a re-ordered version of the converted point cloud data, wherein the reordered version is re-ordered based on a scan order of the distance sensor data prior to packing or compression of the converted point cloud data.

17. The apparatus of claim 15, comprising logic to decompress the received information in accordance with JPEG (Joint Photographic Experts Group), JPEG-LS (JPEG-Lossless) compression, JPEG-XT (JPEG-Extended), JPEG-XS, PNG (Portable Network Graphics) compression, H.264/AVC intra coding or H.265/HEVC intra coding.

18. The apparatus of claim 15, comprising logic to de-quantize the point cloud data from fixed point to floating point representation.

19. One or more non-transitory computer-readable medium comprising one or more instructions that when executed on at least one processor configure the at least one processor to perform one or more operations to:
- receive, at logic circuitry, distance sensor data and convert the received distance sensor data to point cloud data, wherein the point cloud data corresponds to a set of points in a three dimensional (3D) space; and
- store a compressed version of the point cloud data in memory,
- wherein the logic circuitry is to pack the converted point cloud data into one or more two dimensional (2D) arrays, wherein data stored in the one or more 2D arrays are to be compressed to generate the compressed version of the point cloud data, wherein the distance sensor data comprises depth camera sensor data.

20. The one or more non-transitory computer-readable medium of claim 19, further comprising one or more instructions that when executed on the at least one processor configure the at least one processor to perform one or more operations to cause re-ordering of the converted point cloud data based on a scan order of the distance sensor data prior to packing or compression of the converted point cloud data.

21. The one or more non-transitory computer-readable medium of claim 19, further comprising one or more instructions that when executed on the at least one processor configure the at least one processor to perform one or more operations to cause re-order the distance sensor data prior to conversion to the point cloud data.

22. One or more non-transitory computer-readable medium comprising one or more instructions that when executed on at least one processor configure the at least one processor to perform one or more operations to:
- receive, at logic circuitry, information including one or more bit-streams or one or more compressed image files and to unpack the received information, wherein the received information corresponds to a compressed version of point cloud data, wherein the point cloud data corresponds to converted distance sensor data, wherein the point cloud data corresponds to a set of points in a three dimensional (3D) space; and
- wherein the received information is packed into one or more two dimensional (2D) arrays, wherein data stored in the one or more 2D arrays are to be decompressed to generate the distance sensor data, wherein the distance sensor data comprises depth camera sensor data.

23. The one or more non-transitory computer-readable medium of claim 22, further comprising one or more instructions that when executed on the at least one processor configure the at least one processor to perform one or more operations to cause decompression of the received information in accordance with JPEG (Joint Photographic Experts Group), JPEG-LS (JPEG-Lossless) compression, JPEG-XT (JPEG-Extended), JPEG-XS, PNG (Portable Network Graphics) compression, H.264/AVC intra coding, or H.265/HEVC intra coding.

24. The one or more non-transitory computer-readable medium of claim 22, further comprising one or more instructions that when executed on the at least one processor configure the at least one processor to perform one or more operations to cause de-quantization of the point cloud data from fixed point to floating point representation.

\* \* \* \* \*